Feb. 27, 1923.
H. S. SINES
1,446,995
TEMPERATURE COMPENSATING APPLIANCE
Filed Nov. 7, 1921  2 sheets-sheet 1
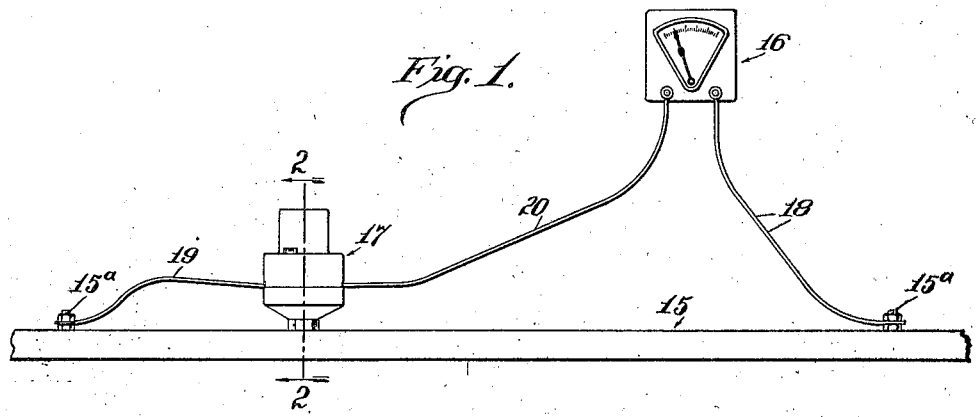
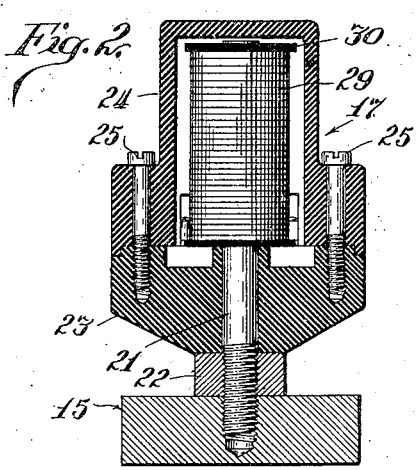
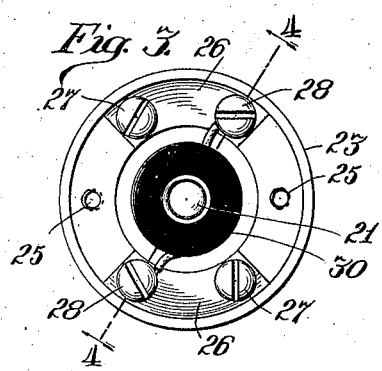
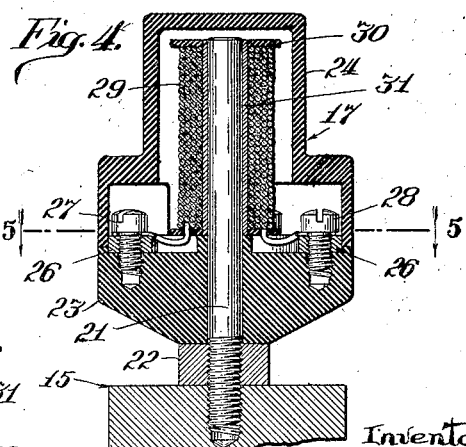
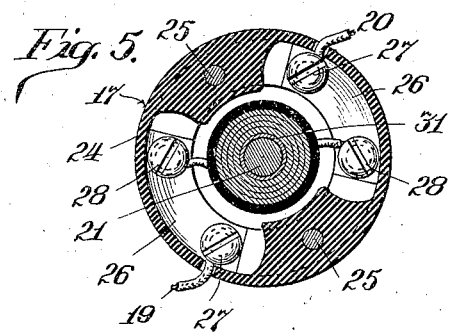
Inventor
Harold S. Sines Feb. 27, 1923.
H. S. SINES
1,446,995
TEMPERATURE COMPENSATING APPLIANCE
Filed Nov. 7, 1921
2 sheets-sheet 2
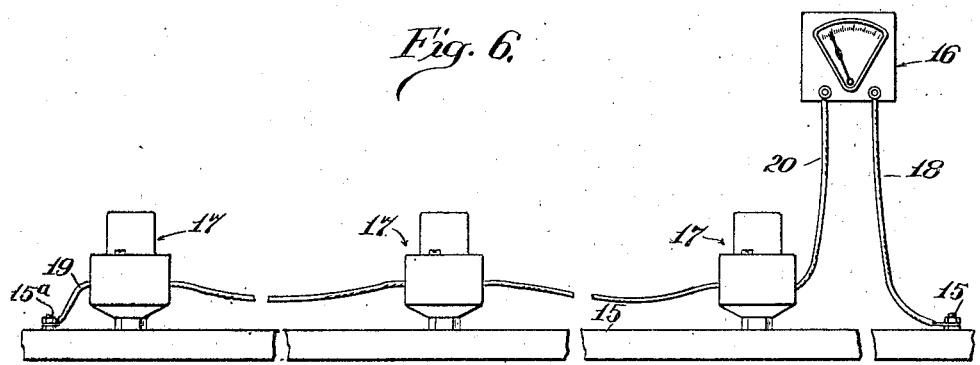
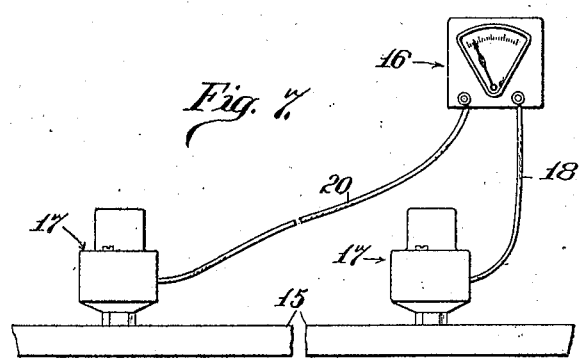
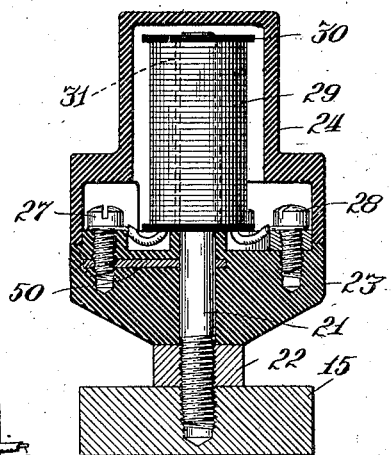
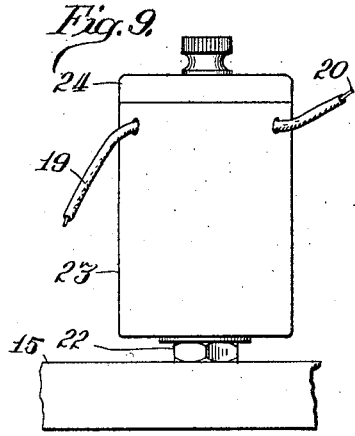
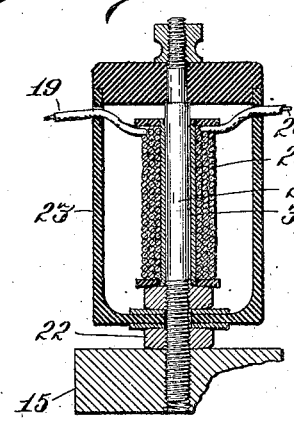

Patented Feb. 27, 1923.

1,446,995

UNITED STATES PATENT OFFICE.

HAROLD S. SINES, OF CHICAGO, ILLINOIS, ASSIGNOR, BY MESNE ASSIGNMENTS, TO MINERALLAC ELECTRIC COMPANY, OF CHICAGO, ILLINOIS, A CORPORATION OF ILLINOIS.

TEMPERATURE COMPENSATING APPLIANCE.

Application filed November 7, 1921. Serial No. 513,617.

*To all whom it may concern:*

Be it known that I, HAROLD S. SINES, a citizen of the United States, and resident of Chicago, in the county of Cook and State of Illinois, have invented a certain new and useful Improvement in Temperature Compensating Appliances, of which the following is a full, clear, concise, and exact description, reference being had to the accompanying drawings, forming a part of this specification.

My invention relates to an appliance capable of compensating for variations in the temperature of that portion of a current carrying conductor, such as a cable or bus bar, across which a high resistance shunt circuit, including a translating device, is connected for the purpose of measuring the current carried by such conductor.

Current measurement in connection with a modern light or power circuit carrying a heavy current is effected by means of a sensitive potential measuring device, such as a millivoltmeter, which is connected in shunt with a portion of a conductor carrying the current to be measured. In most cases, that portion of the said current carrying conductor across which the measuring instrument is connected is in the form of a cable or bus bar of a material, such as copper, the resistance of which varies considerably under changes in temperature. Changes in the temperature of such a cable or bus bar may result from various causes, the principal cause being changes in the load carried by the circuit of which such bar or cable forms a part. Since the measuring instrument must be calibrated with regard to a definite potential drop across that portion of the conductor with which the instrument is connected in shunt, the information afforded by the instrument will be incorrect, beyond an allowable percentage of error, when the temperature, and thus necessarily the resistance, of such portion of the conductor changes, unless some means is provided in connection with the measuring instrument for compensating for such changes in the thermal and resistance characteristics of the current carrying conductor.

My invention contemplates the provision of a device or appliance which will compensate for variations in the resistance of the conductor carrying the current to be measured. The device of my invention is both reliable and uniform with regard to its performance, and is further characterized by the simplicity and durability of its construction, by the ease with which it may be installed, and by the accessibility and interchangeability of its several parts.

In the accompanying drawings illustrating my invention,

Figure 1 illustrates one of the devices of my invention in operative relation to a current carrying bus bar and a measuring instrument, which is electrically connected in shunt of a portion of such bar;

Figure 2 is a sectional view on larger scale taken on line 2—2 of Figure 1;

Figure 3 is a plan view of the device of Figure 2, the cover thereof being removed;

Figure 4 is a section which may be regarded as taken on the line 4—4 of Figure 3, this view illustrating the cover in position;

Figure 5 is a sectional view taken on line 5—5 of Figure 4;

Figure 6 is a view similar to Figure 1, but illustrating an installation wherein a plurality of compensating appliances are employed in connection with a single measuring instrument;

Figure 7 illustrates an installation wherein use is made of a modified form of compensating appliance;

Figure 8 is an axial section of one of the compensating appliances illustrated in elevation in Figure 7;

Figure 9 is an elevational view of a modified and simplified embodiment of my invention, and Figure 10 is an axial section of the device illustrated in elevation in Figure 9.

Similar characters of reference refer to similar parts throughout the several views.

Referring first to Figure 1, reference numeral 15 indicates a copper bus bar which may be regarded as forming part of a light or power circuit. 16 indicates a millivoltmeter (used as an ammeter) which is intended to measure the potential drop between spaced points on said bar, and 17 indicates the compensating appliance with which my invention is particularly concerned.

That part of the bar across which the high resistance circuit of the measuring instrument is connected lies between the two screws 15ª—15ª which are threaded into the bar 15 and constitute means for establishing electrical connection between the bar 15 and the conductors 18 and 19. The conductors 18 and 19, together with conductor 20, serve electrically to connect the instrument 16 and the hereinafter mentioned resistance coil of the compensating device in proper relation to bar 15. It may be assumed that the measuring instrument 16 is of any approved or conventional form, and that its resistance remains substantially constant under operating conditions. For reasons which will hereinafter appear, the resistance of the measuring instrument should preferably constitute but a minor part of the total resistance of the shunt circuit in which the said measuring instrument is connected.

Let us now refer to the compensating appliance which is illustrated in detail in Figures 2 to 5 inclusive. It comprises a heat conducting post 21, the lower end of which is adapted to be imbedded in the metal of that portion of the bar or conductor 15 which is in shunt of the measuring instrument. The post 21 is preferably threaded at its lower end for engagement with the bar 15 and is formed of the same kind of metal as said bar, or at any rate of a metal having the same thermal characteristics as the metal of the bar. In the present case, the post may be regarded as being formed of copper.

Sweated or otherwise fixed upon the post is a metal nut 22 which facilitates its application to or removal from the bar 15. At 23 I have illustrated the lower portion of a housing which also comprises a removable cover 24. The housing portion 23 is fixed to the post 21, conveniently by being molded thereon. Both portions of the housing are formed of some good heat insulating and dielectric material such, for instance, as bakelite, vulcanite, porcelain or the like. Cover 24 is removably held in position by screws indicated at 25—25.

Carried by the fixed housing portion 23 and normally concealed by cover 24 is a pair of metal inserts 26—26, each of which is provided with terminal screws 27 and 28. The inserts 26—26 are preferably held in position by being molded in the material of the housing portion 23, but may, of course, be held firmly in position in any other suitable manner, if desired. As illustrated in Figure 1, one of the screws 27 is connected by conductor 19 with the bus bar, the other of said screws 27 being connected by conductor 20 with one of the terminals of measuring instrument 16. Notches formed in the lower edge of cover 24 (Figures 1 and 5) accommodates conductors 19 and 20.

At 29 I have illustrated a resistance coil which is wound upon a spool consisting of heads 30—30 of fiber, cardboard or the like, and a hollow core 31, the core 31 being formed of copper or other material having the same thermal characteristics as the metal of the bar 15 and the post 21. Core 31 is arranged to fit snugly, but removably, over the upper end of post 21.

The ends of the coil 29 are connected to the inserts 26—26 by means of screws 28—28. At this point, I wish to state that the coil 29 is formed of suitable insulated wire, (copper, if the conductor 15 is formed of copper) the resistance of which will vary correspondingly to that of conductor 15 under similar changes in temperature.

From the foregoing description it is to be understood that the measuring instrument 16 is connected in series with the compensating coil 29. It is desirable that the coil 29 represent a comparatively large part of the total resistance of the shunt circuit which includes the measuring instrument. In practically all cases the resistance of the compensating coil should constitute not less than one-half the total resistance of the shunt circuit. In such cases, at least fifty percent compensation for variations in the temperature of conductor 15 is obtained, usually the resistance of the compensating coil should constitute considerably more than one-half of the resistance of the shunt circuit which includes the measuring instrument.

By virtue of the post 21 and the core 31, the several turns of the compensating coil will at all times have the same temperature as the metal in which the lower end of the post is imbedded, both the post 21 and the core 31 being good conductors of heat. Since the core 31 and all portions of the compensating coil and the larger portion of the post 21 are enclosed within a housing of heat insulating material, the temperature of the several turns of the compensating coil is at all times maintained at the temperature of the bar 15, irrespective of the temperature of the air outside of the heat insulating housing.

I prefer to so calibrate the instrument 16 that, when connected as illustrated in Figure 1, it will correctly measure the current in the circuit of which bar 15 forms a part when such circuit is carrying its rated full load. In this case, the temperature of the several turns of the compensating coil will be substantially the same as the temperature of the bar 15.

Now let us assume that because of a change in the load carried by the circuit of which bar 15 forms a part, or for some other reason, the temperature of bar 15 changes. This change in temperature is accompanied by a change in its resistance. This change in the resistance of bar 15 would be accompanied by a more or less serious error in the indication afforded by instrument 16 were the compensating device of my invention not present. However, as previously explained, the temperature of the compensating coil 29 varies with the temperature of that portion of bar 15 in which post 21 is imbedded. For this reason, the resistance of coil 29 varies with the resistance of bar 15 and thus compensates for the change in the resistance of bar 15. If the resistance of the coil 29 represents a sufficiently large percentage of the total resistance of the shunt circuit including the measuring instrument, the compensation which is afforded by such coil is entirely sufficient to keep the indications of the instrument 16 correct within an allowable percentage of error under all operating conditions.

In the arrangement of Figure 6 I utilize a plurality of compensating appliances in connection with a single measuring instrument. The several coils 29 of these compensating appliances are connected in series with the measuring instrument and with each other. The compensating appliances of Figure 6 are distributed along that portion of the conductor or bus bar 15 which is in shunt with the indicating instrument, and thus compensate for the average temperature of such portion of the conductor 15. This arrangement is desirable when that portion of the conductor which constitutes the ammeter shunt is quite long.

In Figure 8 I have illustrated a slightly modified form of compensating appliance. This modified appliance differs from that previously described only in that one of the metal inserts 26 is electrically connected to post 21 by a jumper 50. The post 21 of the device shown in Figure 8 not only serves as a heat conductor and coil and housing support, but serves also electrically to connect one side of the compensating coil to the current carrying conductor 15.

In Figure 7 I have illustrated the use, in connection with a single ammeter, of two compensating appliances of the type shown in Figure 8. In this case, one side of each compensating coil is connected with one terminal of the ammeter, the other side of the compensating coil being connected through its associated post 21 with the conductor 15. It will be understood, of course, that only one of the appliances of the type shown in Figure 8 need be employed, if desired. In case only one of such appliances is employed, that terminal of the ammeter which is not connected with a compensating device would be connected directly to the conductor 15 in the manner illustrated in Figure 1.

In Figures 9 and 10 I have illustrated a modified and greatly simplified form of compensating appliance which need not be described in detail as the reference characters appended to its several parts will sufficiently identify the same.

The appliance of my invention affords more reliable and uniform compensation for temperature changes in an ammeter shunt than does any other generally similar device with which I am familiar. In addition, the appliance of my invention affords a great many practical advantages which will be readily apparent to persons familiar with the art to which my invention relates. The compensating coil is readily accessible for inspection, testing, replacement or repair. The compensating coil is amply protected and heat insulated by the housing within which it is contained, but it is nevertheless adapted to vary in temperature with the cable, bus bar or other current carrying conductor upon which it is mounted.

While I have elected to illustrate and describe a number of the most desirable embodiments of my invention, it is to be understood that many modifications and variations in features of the appliance are contemplated, and that my invention is to be limited merely by the scope of the appended claims.

What I claim is:

1. In combination with a conductor carrying a current to be measured, a measuring instrument connected in shunt of a portion of said conductor, a compensating coil in series with said instrument, and a heat conducting post projecting from and having one end thereof imbedded in the metal of said current carrying conductor, said resistance coil being disposed around said post.

2. In combination with a conductor carrying a current to be measured, a measuring instrument connected in shunt of a portion of said conductor, a compensating coil formed of the same kind of metal as said conductor, said compensating coil being connected in series with the instrument, and a heat conducting post projecting from and having one end thereof in physical contact with the metal of said current carrying conductor, said compensating coil being disposed around said post.

3. In combination with a conductor carrying a current to be measured, a measuring instrument, a heat conducting post projecting from and having one end thereof in physical contact with said conductor, and a compensating coil closely associated with the heat conducting post.

4. In combination with a conductor carrying a current to be measured, a measuring instrument, a heat conducting post projecting from and having one end thereof in physical contact with said conductor, and a compensating coil closely associated with the heat conducting post, together with a housing of heat insulating material enclosing said compensating coil and the major portion of said heat conducting post.

5. In combination with a conductor carrying a current to be measured, a measuring instrument, a heat conducting post projecting from and having one end thereof threaded into said conductor, and a compensating coil disposed around the other end of said heat conducting post.

6. In combination with a conductor carrying a current to be measured, a measuring instrument, a heat conducting post projecting from and having one end thereof threaded into said conductor, and a compensating coil disposed around the other end of said heat conducting post, together with a heat insulating housing enclosing said compensating coil.

7. In combination with a conductor carrying a current to be measured, a heat conducting post projecting from and having one end thereof in physical contact with said conductor, a compensating coil, and a hollow core of heat conducting metal whereon said compensating coil is wound, said hollow core being adapted to fit snugly around said post.

8. In combination with a conductor carrying a current to be measured, a heat conducting post projecting from and having one end thereof in physical contact with said conductor, a compensating coil, and a hollow core of heat conducting metal whereon said compensating coil is wound, said hollow core being adapted to fit snugly around said post, together with a housing of heat insulating material, said heat insulating housing being supported on the post and lying around said compensating coil.

9. In combination with a conductor carrying a current to be measured, a measuring instrument, a heat conducting post having one end thereof threaded into said conductor, a compensating coil, and a hollow core whereon said compensating coil is wound, said core being adapted to fit over said heat conducting post.

10. In combination with a conductor carrying a current to be measured, a measuring instrument, a heat conducting post having one end thereof in physical contact with said conductor, a compensating coil disposed in close proximity to said post, and a hollow core whereon said compensating coil is wound, said core being snugly but removably fitted around said heat conducting post.

11. A temperature compensating appliance of the class described comprising a housing of heat insulating material, a heat conducting post lying within the housing and having one of its ends projecting from the housing for physical contact with a current carrying conductor, and a compensating coil also disposed within the housing and closely associated with said post and adapted to vary in temperature therewith.

12. A temperature compensating appliance comprising a heat conducting post threaded at one end for engagement with a current carrying conductor, a heat insulating housing carried by and lying around the major portion of said post, and a compensating coil disposed within said housing and closely associated with said post and adapted to vary in temperature therewith.

13. A temperature compensating appliance of the class described comprising a post having one end adapted to have physical contact with a current carrying conductor, a heat insulating housing lying around a portion of said post, and a compensating coil having its several turns passing around said post and adapted to vary in temperature therewith.

14. A temperature compensating appliance comprising a heat conducting post enclosed, except at one end, in a housing of heat insulating material, the exposed portion of said post being adapted for physical contact with a current carrying conductor, a hollow core adapted to fit around that portion of the post which lies within said housing, and a compensating coil wound on said core.

15. In a temperature compensating appliance of the class described, a heat conducting post enclosed, except at one end, in a heat insulating case, the exposed portion of said post being adapted for physical contact with a current carrying conductor, a compensating coil within said housing, a hollow core whereon said coil is wound, said core being adapted to lie around said post, and terminals for said coil carried by said housing.

16. In an appliance for compensating for temperature changes of a conductor carrying a current to be measured, a two part housing of insulating material, a heat conducting member entering said housing through one wall thereof and having its exposed extremity adapted for physical contact with the current carrying conductor, and a compensating coil disposed within the housing, said compensating coil being closely associated with said heat conducting member and being adapted to vary in temperature therewith.

17. A temperature compensating appliance of the class described comprising a housing of insulating material, a heat conducting member by which the housing is carried, said heat conducting member entering the housing through one of the walls thereof, said heat conducting member having its exposed end adapted for physical contact with a current carrying conductor, and a compensating coil disposed within said housing and being closely associated with said heat conducting member and adapted to vary in temperature therewith.

18. A temperature compensating appliance comprising a housing of heat insulating material, a heat conducting member having a portion thereof lying within the housing, said heat conducting member extending through one of the housing walls and having its exposed end adapted for physical contact with a current carrying conductor, a compensating coil located within the housing, and a hollow core whereon the compensating coil is wound, said coil being snugly and removably fitted over that part of the heat conducting member which lies within the housing.

19. A compensating appliance comprising a housing of heat insulating material consisting of a body portion and removable cover, a heat conducting post which lies within the housing and extends through a wall thereof and has its exposed end threaded for engagement with a current carrying conductor, a spool comprising a hollow heat conducting core which is removably fitted around that portion of the heat conducting post which lies within the housing, and a compensating coil wound on said spool and adapted to vary in temperature with said post.

20. In combination with a conductor carrying a current to be measured, a measuring instrument connected in shunt of a portion of said conductor, a compensating resistance coil in series with the measuring instrument, and a housing for said compensating coil, said housing being carried by said conductor, and comprising in its construction heat conducting metal which is in physical contact with said conductor and likewise closely associated with said compensating coil.

21. In a compensating appliance of the class described, a spool carried compensating coil, and a housing wherein said compensating coil is removably mounted, said housing comprising in its construction heat conducting metal which is adapted to lie in physical contact with the metal of a current carrying conductor, the heat conducting metal of the housing being closely associated with the several turns of said compensating coil.

In witness whereof, I hereunto subscribe my name this 15th day of October, 1921.

HAROLD S. SINES.

Witnesses:
EDNA V. GUSTAFSON,
EMILE BOURGEOIS.